US012663930B2

(12) United States Patent (10) Patent No.: US 12,663,930 B2
Alpert et al. (45) Date of Patent: Jun. 23, 2026

(54) MEMORY ALLOCATOR

(71) Applicant: TEXAS INSTRUMENTS INCORPORATED, Dallas, TX (US)

(72) Inventors: Yaron Alpert, Hod-Hasharon (IL); Avi Sammy Berkovich, Herzliya (IL); Yoav Ben Yehezkel, Netanya (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/408,023

(22) Filed: Jan. 9, 2024

(65) Prior Publication Data

US 2025/0224891 A1 Jul. 10, 2025

(51) Int. Cl.
*G06F 3/06* (2006.01)
(52) U.S. Cl.
CPC .......... *G06F 3/0631* (2013.01); *G06F 3/0644* (2013.01); *G06F 3/0658* (2013.01); *G06F 3/0604* (2013.01); *G06F 3/0671* (2013.01)
(58) Field of Classification Search
CPC ................................ G06F 3/06; G06F 9/5011
See application file for complete search history.

(56) References Cited

U.S. PATENT DOCUMENTS

| | | | | |
|---|---|---|---|---|
| 10,061,692 B1 * | 8/2018 | Nicklin | ................. | G06F 3/0605 |
| 10,432,722 B2 * | 10/2019 | Jain | ....................... | G06F 9/5016 |
| 10,572,159 B1 * | 2/2020 | Thrane | ................. | G06F 3/0649 |
| 10,635,336 B1 * | 4/2020 | He | ........................ | G06F 3/0604 |
| 2018/0157585 A1 * | 6/2018 | Barrus | .................. | G06F 12/023 |
| 2021/0117320 A1 * | 4/2021 | Mahesh | .............. | G06F 11/1076 |
| 2022/0237113 A1 * | 7/2022 | Woo | .................... | G06F 12/0882 |
| 2023/0074388 A1 * | 3/2023 | Rao | ........................ | G06F 3/0659 |

OTHER PUBLICATIONS

Arm, "The Memory Protection Unit," ARM Cortex-R Series Programmer's Guide, Copyright 1995-2023, 2 p. [Online] https://developer.arm.com/documentation/den0042/a/The-Memory-Protection-Unit.
Infineon Technologies AG, MPU Memory Protection, MPU Memory Protection for Kit Aurix TC375 LK, Edition Mar. 2021, 15 p. [Online] https://www.infineon.com/dgdl/Infineon-MPU_Memory_Protection_1_KIT_TC375_LK-Training-v01_00-EN.pdf?fileId=5546d4627883d7e00178a2b2872838ae.
Wikipedia, "Memory Protection Unit," downloaded Jan. 9, 2024, 1 p. [Online] https://en.wikipedia.org/wiki/Memory_protection_unit.

* cited by examiner

*Primary Examiner* — Khoa D Doan
(74) *Attorney, Agent, or Firm* — Michelle F. Murray; Frank D. Cimino

(57) ABSTRACT

In some examples, an apparatus includes a data store and a controller. The is communicatively coupled to the data store. The controller is configured to receive a request to allocate a memory cluster, the request indicating a requested memory attribute other than a requested size of the memory cluster. The controller is also configured to, responsive to receipt of the request, determine, based on one or more memory attributes of a plurality of memories accessible by the apparatus, an available memory from among the plurality of memories, the available memory capable of providing the requested memory attribute. The controller is also configured to, responsive to determining the available memory, make a memory allocation decision.

31 Claims, 4 Drawing Sheets

500

502 — DETERMINE WHETHER SUFFICIENT SPACE EXISTS IN A MEMORY HAVING A REQUESTED MEMORY ATTRIBUTE AND DETERMINED TO BE AVAILABLE TO PROVIDE A REQUESTED MEMORY ALLOCATION sufficient space does not exist Sufficient space exists 504 — MODIFY A MEMORY MAP ASSOCIATED WITH ONE OR MORE OF THE AVAILABLE MEMORIES TO INCLUDE A MEMORY CLUSTER AS REQUESTED BY THE MEMORY ALLOCATION REQUEST

506 — PERFORM ONE OR MORE ACTIONS

508 — PROVIDE A NOTIFICATION

510 — RECEIVE A SECOND MEMORY ALLOCATION REQUEST FOR A MEMORY ALLOCATION IN A MEMORY CAPABLE OF PROVIDING THE REQUESTED MEMORY ATTRIBUTE HAVING THE SECOND VALUE

512 — MODIFY A MEMORY MAP ASSOCIATED WITH ONE OR MORE OF THE AVAILABLE MEMORIES TO INCLUDE A MEMORY CLUSTER AS REQUESTED BY THE MEMORY ALLOCATION REQUEST

300

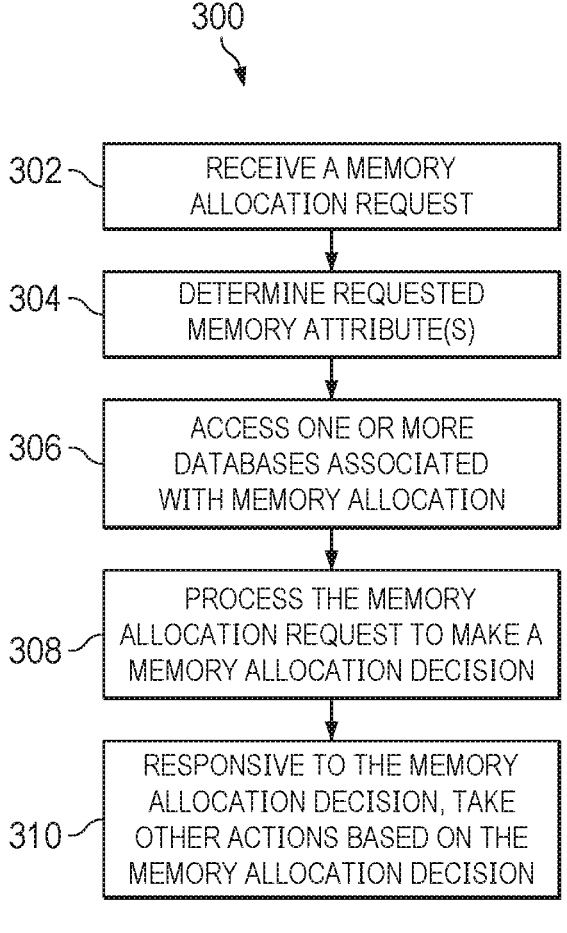

302 — RECEIVE A MEMORY ALLOCATION REQUEST

304 — DETERMINE REQUESTED MEMORY ATTRIBUTE(S)

306 — ACCESS ONE OR MORE DATABASES ASSOCIATED WITH MEMORY ALLOCATION

308 — PROCESS THE MEMORY ALLOCATION REQUEST TO MAKE A MEMORY ALLOCATION DECISION

310 — RESPONSIVE TO THE MEMORY ALLOCATION DECISION, TAKE OTHER ACTIONS BASED ON THE MEMORY ALLOCATION DECISION

402 — RECEIVE A MEMORY DEALLOCATION REQUEST

404 — DEALLOCATE ONE OR MORE MEMORY CLUSTERS BY MODIFYING A MEMORY MAP

406 — PROVIDE MEMORY DEALLOCATION FEEDBACK

FIG. 4

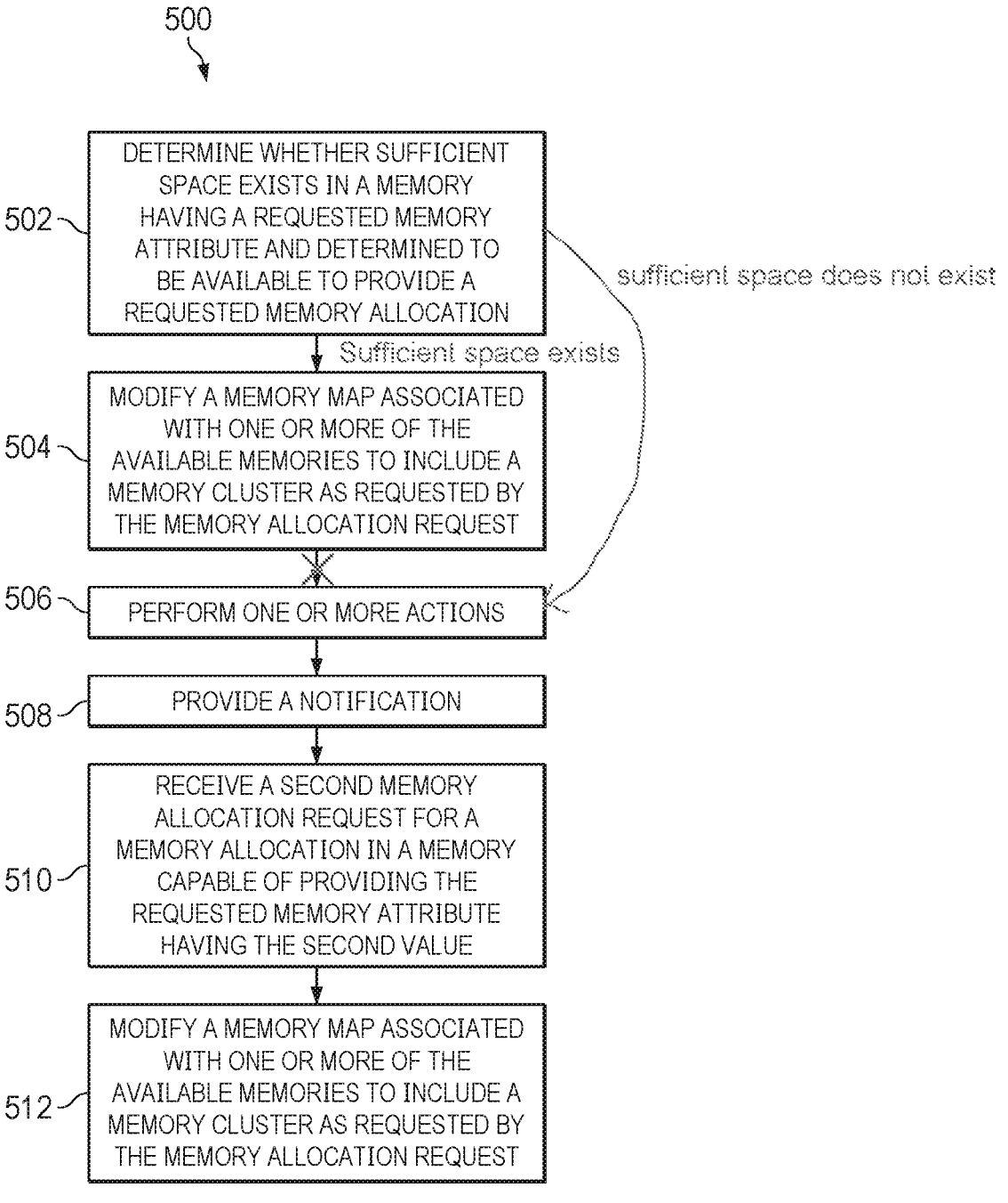

500

502 — DETERMINE WHETHER SUFFICIENT SPACE EXISTS IN A MEMORY HAVING A REQUESTED MEMORY ATTRIBUTE AND DETERMINED TO BE AVAILABLE TO PROVIDE A REQUESTED MEMORY ALLOCATION sufficient space does not exist Sufficient space exists 504 — MODIFY A MEMORY MAP ASSOCIATED WITH ONE OR MORE OF THE AVAILABLE MEMORIES TO INCLUDE A MEMORY CLUSTER AS REQUESTED BY THE MEMORY ALLOCATION REQUEST

506 — PERFORM ONE OR MORE ACTIONS

508 — PROVIDE A NOTIFICATION

510 — RECEIVE A SECOND MEMORY ALLOCATION REQUEST FOR A MEMORY ALLOCATION IN A MEMORY CAPABLE OF PROVIDING THE REQUESTED MEMORY ATTRIBUTE HAVING THE SECOND VALUE

512 — MODIFY A MEMORY MAP ASSOCIATED WITH ONE OR MORE OF THE AVAILABLE MEMORIES TO INCLUDE A MEMORY CLUSTER AS REQUESTED BY THE MEMORY ALLOCATION REQUEST

FIG. 5

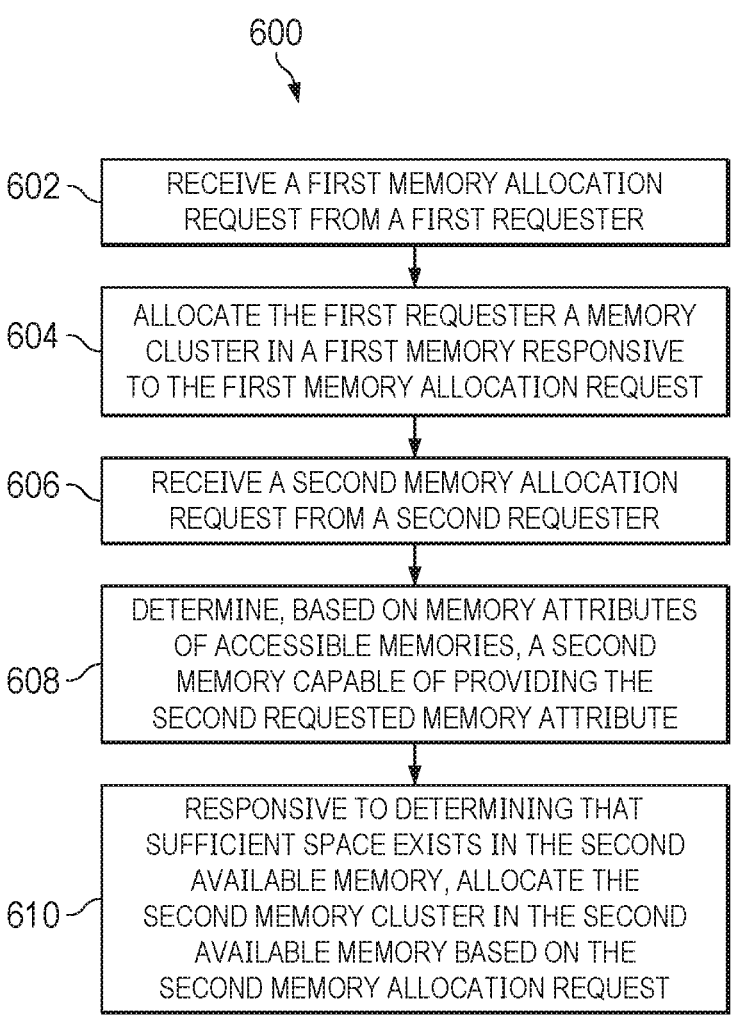

600

602 — RECEIVE A FIRST MEMORY ALLOCATION REQUEST FROM A FIRST REQUESTER

604 — ALLOCATE THE FIRST REQUESTER A MEMORY CLUSTER IN A FIRST MEMORY RESPONSIVE TO THE FIRST MEMORY ALLOCATION REQUEST

606 — RECEIVE A SECOND MEMORY ALLOCATION REQUEST FROM A SECOND REQUESTER

608 — DETERMINE, BASED ON MEMORY ATTRIBUTES OF ACCESSIBLE MEMORIES, A SECOND MEMORY CAPABLE OF PROVIDING THE SECOND REQUESTED MEMORY ATTRIBUTE

610 — RESPONSIVE TO DETERMINING THAT SUFFICIENT SPACE EXISTS IN THE SECOND AVAILABLE MEMORY, ALLOCATE THE SECOND MEMORY CLUSTER IN THE SECOND AVAILABLE MEMORY BASED ON THE SECOND MEMORY ALLOCATION REQUEST

FIG. 6

MEMORY ALLOCATOR

TECHNICAL FIELD

The present disclosure relates generally to an electronic system and method, and, in particular embodiments, to a memory allocator.

BACKGROUND

Various electronic devices include a memory for storing data. Some devices include multiple memories of different types.

SUMMARY

In some examples, an apparatus includes a data store and a controller. The controller is communicatively coupled to the data store. The controller is configured to receive a request to allocate a memory cluster, the request indicating a requested memory attribute other than a requested size of the memory cluster. The controller is also configured to, responsive to receipt of the request, determine, based on one or more memory attributes of a plurality of memories accessible by the apparatus, an available memory from among the plurality of memories, the available memory capable of providing the requested memory attribute. The controller is also configured to, responsive to determining the available memory, make a memory allocation decision.

BRIEF DESCRIPTION OF THE DRAWINGS

FIG. 3 is a flowchart of a method for operation of an allocator, in accordance with various examples.

FIG. 4 is a flowchart of a method for operation of an allocator, in accordance with various examples.

FIG. 5 is a flowchart of a method for operation of an allocator, in accordance with various examples.

FIG. 6 is a flowchart of a method for operation of an allocator, in accordance with various examples.

DETAILED DESCRIPTION

Figure 1:
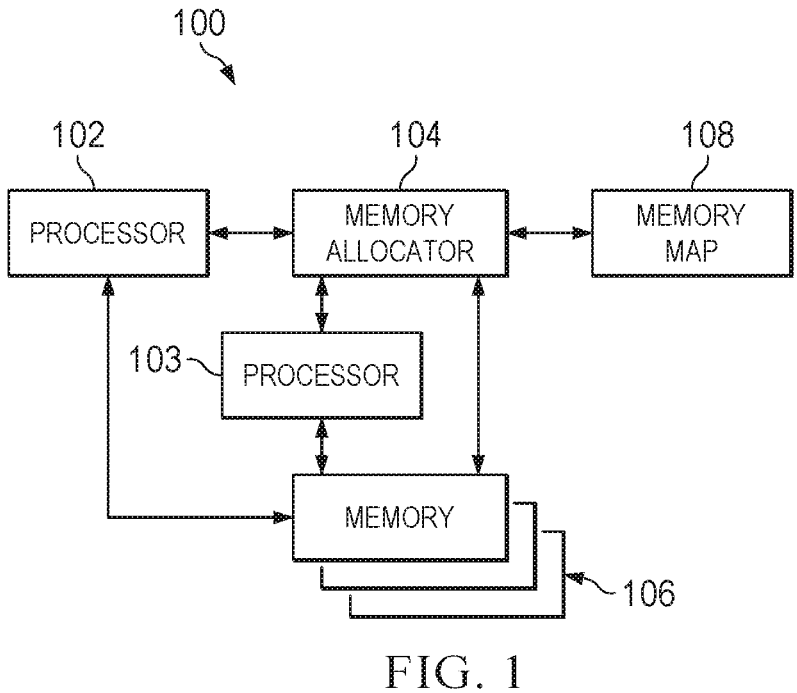
FIG. 1 is a block diagram of an electronic device, in accordance with various examples.

The making and using of the embodiments disclosed are discussed in detail below. It should be appreciated, however, that the present disclosure provides many applicable inventive concepts that can be embodied in a wide variety of specific contexts. The specific embodiments discussed are merely illustrative of specific ways to make and use the invention(s), and do not limit the scope of the invention(s).

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" or "in one example" that may appear at different points of the present description do not necessarily refer exactly to the same embodiment. Furthermore, specific formations, structures or features may be combined in any appropriate manner in one or more embodiments.

In an embodiment, a memory attribute-aware memory allocator allocates clusters to one or more requesters (from one or more hardware entities) based on at least one memory attribute that is different from the requested size. By allocating clusters based on the requirements of each requester and the characteristics of the available memories, some embodiments may advantageously consume less power, achieve higher performance (e.g., lower latency, higher throughput, etc.), and/or reduce cost (e.g., by reducing the amount of memory without impacting performance, e.g., by optimizing memory allocation).

Some electronic devices include multiple memories. The multiple memories can be of different types and can have various memory attributes (e.g., speed, security, power, availability of caching, etc.) such that for a given capability, a first memory may provide increased performance or functionality compared to a second memory. Space in the memories may be allocated statically, such as at a compile or build time of a program for execution on, or by, the electronic device, thereby provided a pre-defined and preserved allocation or static memory map generation as determined at compile or build time. For example, code for the program may be compiled to form an image or executable file that, responsive to execution by a processor, implements the program via the processor. A compiler that compiles the code to form the executable may construct a memory allocation map that allocates portions of the memories to the program by default. In some examples, a user may enforce allocation constraints on some or all parts of the code. Contrasted with static allocation of space or clusters in the memories, the space or clusters in the memories may be (e.g., in addition to the static allocation) allocated dynamically. For example, at run time of the program on the electronic device, the program may request allocation of a particular amount of space in the memories.

In both, static memory allocation and dynamic memory allocation, the allocation may be performed in a manner that is unaware of the memory attributes of the memory in which the allocation is being performed. As such, a requester (e.g., program, device, process, etc.) that may benefit from allocation of an existing and available memory of the device having a particular attribute (e.g., low latency, low power, high throughput, fast read, fast write, etc.) may instead be allocated a memory of the device that lacks such particular feature.

For example, in a first scenario, if memory allocation is made without attribute awareness, a request that could benefit from fast temporary read/write speed (e.g., from static random-access memory (RAM) (SRAM)) may instead be allocated with a memory having a slow read/write speed. As another example, if memory allocation is made without attribute awareness, a requester capable of functioning with an allocation of memory having a slow read/write speed may instead be allocated memory having a fast read/write speed, thereby unnecessarily occupying space in the fast memory and preventing other requesters that could benefit from the fast memory from being allocated to the fast memory.

In some embodiments, memory allocation is attribute-aware, such that memories are assigned to requesters based on the needs, or requests, of each requester (e.g., subject to availability), which may advantageously result in higher performance, lower power, and/or lower memory space requirements (e.g., which may advantageously result in lower cost). In this way, the memory having a faster temporary read/write speed, which may be more limited in available storage capacity because of a comparatively larger space consumption and power consumption of the memory, may be preserved for requesters that may benefit from the fast temporary read/write speed rather than allocating the memory having a faster temporary read/write speed to the requester capable of functioning with the allocation of memory having the slower read/write speed.

In some embodiments, the device may include high-performance memory (e.g., to facilitate high-performing devices). High-performance memory may have a higher cost, consume a larger amount of space, and consume a greater amount of power than other lower performing memories. These characteristics may make the high-performance memory unsuitable for certain application environments, such as due to a memory resource limit. For example, some application environments, such as Internet of Things (IoT) or other devices, may be area constrained, power constrained, or cost constrained. However, devices in these application environments may still have a need for at least some high-performance memory. Thus, the devices may include multiple memories where the memories have varied memory attributes. The memory attributes may include, for example, a location (e.g., internal to the device or external to the device) of the memory, an access speed or time of the memory, the availability or non-availability of a cache, the availability or non-availability of security features, the availability or non-availability of encryption, power consumption (e.g., read, write, peak, average, or the like), persistence or non-persistence of the memory, volatility or non-volatility of the memory, whether the memory is a retained or non-retained memory, reliability characteristics of the memory, redundancy characteristics of the memory, placement constraints, or the like. In some examples, the memory attributes are independent of a memory size, or available memory space, of the memories.

Because some requesters, or particular operations of a requester, may benefit more than other requesters from a particular feature of a particular memory (e.g., the increased performance of the high-performance memory, the lower power of a low-power memory, etc.), or more generally may benefit from a memory having a particular memory attribute or memory attribute in an amount greater than the other requester may, it may be useful to allocate that requester, or certain operations of that requester, to the particular memory. Some embodiments optimize the memory allocations of a requester or multiple requesters among available memories in an electronic device.

Conventional memory allocations are performed without regard to memory attributes, other than available space, of memories. To perform optimized memory allocation, in some embodiments, memory allocation is memory attribute-aware, such that a memory allocator enables static and/or dynamic memory allocation into memories with consideration of the memory attributes of the memories and values of those memory attributes which may be useful for a requester.

In some examples, the requester provides a memory allocation request requesting allocation within a memory. The memory allocation request may include an implicit request for particular memory attributes of memories in which the requester receives a memory allocation. The implicit request may be deduced or determined by the allocator from a memory allocation request received by the allocator from the requester. For example, the memory allocation request may include at least a requested size of a memory cluster for allocation in the memories and an indication of an identifier of the requester issuing the memory allocation request. As used herein, a memory cluster may be a non-continuous memory space that may include several memory types that cluster together. The allocator may receive the memory allocation request and index into a database using the identifier of the requester issuing the memory allocation request. Based on the identifier and the database, the allocator may determine requested memory attributes for memory allocation requests from that particular requester. For example, the database may indicate that all memory allocation requests from a requester having a first identifier are to receive memory allocations in a memory having a speed greater than a first threshold, if available, and that all memory allocation requests from a second requester having a second identifier are to receive memory allocations in a second memory having a speed less than the first threshold, if available, less than a second threshold, or the like. In some examples, the database may also consider the size of the memory cluster requested in the memory allocation request. For example, a memory allocation request from the requester having the first identifier for a memory cluster having a first size may be serviced with an allocation to a first memory while a memory allocation request from the requester having the first identifier for a memory cluster having a second size may be serviced with an allocation to a second memory based on the requested memory attributes for the requester for the size of the requested memory cluster.

In some embodiments, the memory allocator may receive a conventional memory allocation request from a requester, and may still make a memory attribute-aware allocation based on determining the source identity of the memory request (e.g., based on the time in which the request is received, the mechanism (e.g., wires) in which the request is received, or in some other ways) and using the source identity to query a database to determine memory preference(s) associated with the request).

In some examples, the requester may include an explicit request for particular memory attributes of memories in which the requester receives a memory allocation. For example, the requester may provide a memory allocation request to the allocator in which the requester specifies values for one or more memory attributes of a requested memory allocation. For example, the requester may explicitly request allocation of a memory cluster in a memory having a speed greater than a first threshold, having a power consumption less than a second threshold, having encryption, or any other one or more memory attributes, as described above herein.

In various examples, the allocator attempts to allocate a memory cluster in the memories having memory attributes specified or requested by the requester in the memory allocation request. For example, the allocator may maintain, or have access to, a database having information of the memory attributes of the memories accessible by the electronic device. Responsive to receiving a memory allocation request, the allocator may determine the requested memory attributes for a memory allocation (e.g., either implicitly, by looking up the requester identifier in another database to determine the requested memory attributes associated with that requester identifier, or explicitly based on values included in the memory allocation request for the requested memory attributes), access the database to determine available memories which are accessible by the electronic device and capable of providing the requested memory attributes, and determine whether sufficient space exists in the available memories to provide the requested memory allocation.

Responsive to sufficient space existing, the allocator may modify a memory map associated with one or more of the available memories to include a memory cluster as requested by the memory allocation request. Responsive to sufficient space not existing, or responsive to no memories accessible by the electronic device at a given time being capable of providing the requested memory attributes, the allocator may perform one or more actions. In an example, the allocator may wait a programmed amount of time and reattempt the allocation. In another example, the allocator may perform a best fit allocation which does not satisfy at least one requested memory attribute indicated by the memory allocation request. In such an example, the allocator may provide a notification to the requester that a memory allocation has been performed, but that the memory allocation does not provide the at least one requested memory attribute. In another example, the allocator may notify the requester that a memory having the at least one requested memory attribute is not available. In such an example, the allocator may provide a recommendation for modifying the at least one requested memory attribute from a first value which is not available in a memory accessible by the electronic device to a second value which is available in a memory accessible by the electronic device. In some examples, responsive to the notification, the allocator receives a second memory allocation request from the requester, in which the second memory allocation request includes a memory allocation in a memory capable of providing the requested memory attribute having the second value. Responsive to the second memory allocation request, the allocator may modify a memory map associated with one or more of the available memories to include a memory cluster as requested by the second memory allocation request.

FIG. 1 is a block diagram of an electronic device 100, in accordance with various examples. In an example, the electronic device 100 is representative of an electronic device, such as an IoT device, a sensor device, a smartphone, a computing device, or the like. In various examples, the electronic device 100 includes a processor 102, a memory allocator 104, a plurality of memories 106, and a memory map 108. In some examples, the plurality of memories 106 include or implement a data store in which data may be stored, such as databases for reference or use in operation of the electronic device 100. For example, a memory, database, or the like may be stored as, or in, a partition or other logical structure of a data store. Although shown in FIG. 1, the memory map 108 may not be a physical component, but may rather be a data structure stored in any suitable database, which may be stored inside electronic device 100 (e.g., in a memory not shown in FIG. 1) and/or external to electronic device 100, e.g., accessible via the Internet or a local or external memory. In an example, the processor 102 executes instructions of an executable file, such as program image, to execute a program. In some examples, more than one processor 102 may be present in the electronic device 100.

Although FIG. 1. illustrates a single processor 102, some embodiments may include a plurality of hardware entities (hardware accelerators, processors, etc.) operating as requesters. For example, in an embodiment, the electronic device 100 includes, or couples to, a processor 103. In one example, the processor 103 may be included in the electronic device 100. In another example, the processor 103 may be included in another device (not shown) and coupled to the electronic device 100, such as to access the plurality of memories 106 such that the plurality of memories 106 function as a pool of shared memories. Generally, in interactions with the allocator 104, the processor 103 operates in a manner substantially similar to that described herein in reference to the processor 102, the description of which is not separately repeated for the processor 103.

Responsive to loading instructions of the executable file into the processor 102 for subsequent execution, or executing the instructions of the executable file, the processor 102 (e.g., programs/applications and/or other hardware or software entities inside processor 102) may provide one or more memory allocation requests, to the allocator 104. Responsive to receiving a memory allocation request, the allocator 104 determines a requested memory attribute of the memory allocation request. The requested memory attribute may be a requested memory attribute for a memory in which a memory cluster is, or may be, allocated pursuant to the memory allocation request and may be independent of a requested size for the memory cluster. In some examples, the allocator 104 determines the requested memory attribute via an implicit indication, such as an identifier of the processor 102 (e.g., or an identifier of an associated program/application/thread running on processor 102), or requester, for which the memory cluster is to be allocated, as described above. In some examples, the allocator 104 determines the requested memory attribute via an explicit indication included in the memory allocation request, such as an explicitly provided value included in the memory allocation request for the requested memory attribute.

Responsive to determining the requested memory attribute, the allocator 104 determines whether a memory of the plurality of memories 106 is available to provide a memory cluster having the requested size and the requested memory attribute. For example, the allocator 104 may examine a database that includes a listing of the plurality of memories 106 and the memory attribute(s) that each of the plurality of memories 106 is capable of supporting or providing. Responsive to determining that a memory, or memories, of the plurality of memories 106 is available for (e.g., capable of) providing the requested memory attribute, the allocator 104 determines whether the available memory has sufficient available space for providing a memory cluster having the requested size. In some examples, the allocator 104 determines whether the available memory has sufficient available space by examining the memory map 108, or another memory map (not shown) such as a temporary memory map stored by the allocator 104. Responsive to determining that the available memory has sufficient space for providing the memory cluster, the allocator 104 may allocate the memory cluster in the available memory. The allocator 104 may allocate the memory cluster by making an entry or otherwise modifying the memory map 108, or the temporary memory map.

Responsive to determining that the available memory does not have sufficient space for allocating the memory cluster, or responsive to determining that no memory of the plurality of memories 106 is available for providing the requested memory attribute, the allocator 104 provides a notification to the processor 102. In some examples, the notification is, or is included in, a memory allocation request feedback message. The notification may indicate that memory has not been allocated pursuant to the memory allocation request, may provide a recommendation for a change to a value of the requested memory attribute to cause a memory of the plurality of memories to be capable of providing the requested memory attribute, or the like. In some examples, the notification may indicate that a memory cluster not having the requested memory attribute has been allocated for the processor 102. For example, the memory cluster may be allocated in a memory of the plurality of memories 106 having a best or closest match to one or more requested memory attributes indicated by the memory allocation request. In some examples, responsive to the notification, the processor 102 may transmit a second memory allocation request to the allocator 104. The second memory allocation request may include a second requested memory attribute, where the second requested memory attribute has a different value than the requested memory attribute indicated by the first memory allocation request. For example, the second requested memory attribute may be selected based on the recommendation included in the notification by the allocator 104. In some embodiments, processor 102 may be implemented as a generic or custom processor or controller, e.g., capable of executing instructions stored in an associated memory. In some embodiments, processor 102 may include multiple processing cores. In some embodiments, processor 102 may implement a stack, such as a Bluetooth or Bluetooth Low Energy (BLE) stack, where an application running at the application layer of the stack operates as the requestor.

In an example, the processor 102 and the processor 103 share some or all of the plurality of memories 106 as a shared resource, where each of the processor 102 and the processor 103 may request and be allocated memory space or memory clusters in the plurality of memories 106. In an example, the processor 102 may request, via a first memory allocation request, and receive a memory allocation in a first memory of the plurality of memories 106, as described above. The processor 103 may also request, via a second memory allocation request, and receive a memory allocation in a second memory of the plurality of memories 106, as described above, despite the first memory having sufficient available storage space to service the memory allocation to the processor 103. For example, the first memory allocation request may include a first identifier of the processor 102, and the second memory allocation request may include a second identifier of the processor 103. In some examples, the allocator 104 provides the processor 102 with a memory allocation in the first memory based on the first identifier, and provides the processor 103 with a memory allocation in the second memory based on the second identifier, or vice versa, according to a serving or allocation policy of the allocator 104.

In some embodiments, memory allocator 104 may include one or more generic or custom processors or controllers, a state machine, and/or other hardware (e.g., logic/combinatorial) circuit to implement the functions described herein. In some embodiments, memory allocator 104 is external to processor 102 (as shown in FIG. 1). In some embodiments, memory allocator 104 may be implemented as part of processor 102.

In some embodiments, one (or more, e.g., all) memory of the plurality of memories 106 are of different types and exhibit different characteristics than other(s) of the memories of the plurality of memories 106. Each of the memories may be implemented in any way known in the art.

In some embodiments, device 100 may be a micro-controller unit (MCU) micro-processor unit (MPU), digital signal processor (DSP), central processor unit (CPU), graphics processor unit (GPU), data processing unit (DPU), or the like including processor 102 (and sometimes processor 103) and memory allocator 104. In some embodiments, processor 102 (and sometimes processor 103) and memory allocator

104 are integrated in a single integrated circuit (IC), which may include one or more (or all) of the memories 106.

Figure 2:
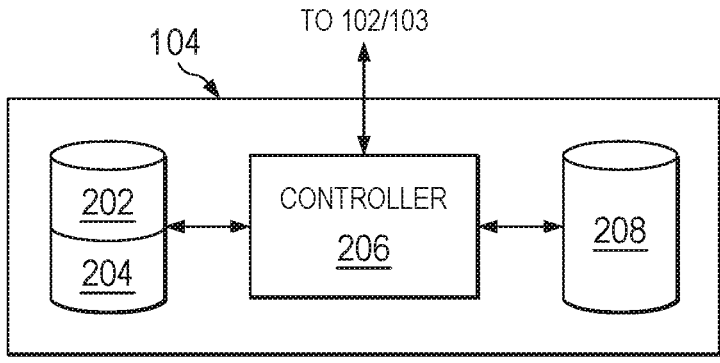
FIG. 2 is a block diagram of an allocator, in accordance with various examples.

FIG. 2 is a block diagram of the allocator 104, in accordance with various examples. In some examples, the allocator 104 includes a system performance database 202, a memory attribute database 204, a controller 206, and a temporary allocation map database 208. In at least some examples, the controller 206 may perform actions attributed to the allocator 104 herein, such as to receive a memory allocation request from the processor 102 and perform a memory allocation, or indicate that a memory allocation having a requested memory attribute could not be performed.

As described above, the allocator 104, such as via the controller 202, may receive a memory allocation request, such as from the processor 102 or another processor, circuit, program, process, or requester. In various examples, in servicing the memory allocation request the controller 206 considers contents of the memory allocation request (such as one or more requested memory attributes, a ID of the memory allocation requester, and/or a priority level of the memory allocation request (e.g., in the circumstance of multiple, or competing, memory allocation requests)), memory attributes of the plurality of memories, such as may be stored in the memory attribute database 204, and/or system limitations of the electronic device 100, such as may be stored in the system performance database 202.

Responsive to receiving the memory allocation request, the controller 206 determines whether any requested memory attributes other than a requested memory cluster size are indicated by, included in, or otherwise associated with the memory allocation request. For example, the requested memory attributes may be indicated implicitly or explicitly. In an example, the implicit indication may be based on the ID of the memory allocation requester (e.g., an ID of the processor 102, a program, process, function, requester, or other device that provides the memory allocation request). For example, the controller 206 may index into or otherwise reference or access a database (not shown) to determine one or more requested memory attributes associated with the ID of the memory allocation requester. In some examples, a first set (which may be a set of 1) requested memory attributes are associated with the ID of the memory allocation requester for a memory allocation request that requests a memory cluster having a requested size in a first size range. Similarly, a second set (which also may be a set of 1) requested memory attributes are associated with the ID of the memory allocation requester for a memory allocation request that requests a memory cluster having a requested size in a second size range different from the first size range. In another example, the explicit indication may be included in the memory allocation request. For example, the memory allocation request may include one or more values for respective memory attributes, other than a requested memory cluster size, requested by the memory allocation request. In various examples, the requested memory attribute may be a memory cluster access speed or responsivity (e.g., minimum, maximum, typical, median, mean, mode, etc.), a memory cluster access type (e.g., read, read and write, data access, code execution access, etc.), memory cluster power consumption (e.g., minimum, maximum, typical, median, mean, mode, etc.), a memory cluster operation profile (e.g., critical or non-critical, secure or non-secure, encrypted or non-encrypted, required or not for boot/recovery, cache availability or non-availability, etc.), memory cluster reliability characteristics, memory cluster redundancy characteristics, memory cluster rearrangement policy, or the like. In some examples, the requested memory attributes may also include recommended constraints to achieve particular performance characteristics, such as a recommended memory from among multiple available memories that are capable of providing a particular memory attribute. In some examples, the requested memory attributes may also include memory cluster dependencies (e.g., dependency on other already allocated memory clusters or not yet allocated memory clusters, simultaneous memory cluster allocation, a memory cluster lifetime, etc.). In some examples, the requested memory attributes may also indicate whether rearrangement of supporting memory clusters, such as via memory reallocation requests, is permitted to facilitate servicing of the memory allocation request.

Responsive to determining the requested memory attribute(s) indicated by the memory allocation request, the controller 206 determines whether an available memory exists to provide a memory cluster having the requested memory attribute(s). For example, the controller 206 may index into or otherwise reference or access the memory attribute database 204 to determine whether any memories available to the allocator 104 (e.g., such as a memory of the plurality of memories 106) are capable of providing the requested memory attribute(s). In some examples, the memory attribute database 204 includes a table or other data structure that relates available or supported memory attributes to memories available to the allocator 104. For example, for each memory accessible to the allocator 104, the memory attribute database 204 may include a location of the memory (e.g., internal to the electronic device 100 or external to the electronic device 100), an access (e.g., read or write) time (e.g., minimum, maximum, typical, median, mean, mode, etc.), the availability or non-availability of a cache, availability or non-availability of security features, availability or non-availability of encryption, power consumption (e.g., minimum, maximum, typical, median, mean, mode, etc.), persistence or non-persistence, volatility or non-volatility, retained or non-retained, reliability, redundancy, placement constraints (e.g., whether the memory is specified for placement at build time at a particular or specific memory address), or the like.

In some examples, the controller 206 also considers system performance parameters of the electronic device 100. For example, after determining that a memory accessible to the allocator 104 is available to provide the requested memory attribute, the controller 206 may index into or otherwise reference or access the system performance database 202 to determine performance characteristics or limitations of the electronic device 100. For example, the system performance database 202 may include information related to limitations or operational characteristics of the processor 102, information related to limitations or operational characteristics of communication buses in the electronic device 100, user-defined policies or profiles for memory cluster allocation, restrictions on memory groupings or sets, or the like.

Responsive to determining, based on the system performance database 202 and memory attributes database, that the requested memory attribute is supportable in the electronic device 100, the controller 206 determines whether sufficient space exists in the available memory for allocation of a memory cluster having the requested size. For example, the controller 206 may examine the temporary allocation map database 208 to determine whether sufficient space exists in the available memory for allocation of a memory cluster having the requested size. In some examples, the temporary allocation map database 208 includes a temporary memory allocation map that indicates allocation ranges available (e.g., free allocation range) per memory of the memories accessible to the allocator 104 (e.g., such as the plurality of memories 106). Based on the available memory and the allocation ranges available for that available memory, the controller 206 makes a memory allocation decision or determination. For example, the controller 206 may allocate a memory cluster in one or more available memories to satisfy the memory allocation request, or may determine that sufficient available space does not exist for allocating the requested memory cluster.

In some examples, the controller 206 provides memory allocation feedback (e.g., such as a memory allocation request feedback message) to the processor 102, or to a program, function, process, requester, or other device from which the memory allocation request was received. In various examples, the memory allocation feedback may include a memory allocation map (e.g., a final memory allocation map, such as the memory allocation map 108 or a temporary memory allocation map, such as stored in the temporary allocation map database 208), one or more recommendations for memory mapping or memory attributes that may lead to performance improvements based on real-location of existing allocated memory clusters, an expected performance key performance indicators (KPI) value for the allocated memory cluster, various status information of the allocated memory cluster, the allocator, or the memories, a notification or indication that the requested memory attribute and/or requested memory cluster size could not be provided and therefore no memory cluster was allocated, a notification or indication that the requested memory attribute and/or requested memory cluster size could not be provided and therefore a memory cluster in a memory having a best fit or closest match to the requested memory attribute was provided, or the like. In some examples, the notification or indication that the requested memory attribute and/or requested memory cluster size could not be provided and therefore no memory cluster was allocated may also include a recommendation for a revised value of the requested memory attribute to enable the controller 206 to allocate a memory cluster having performance compatible with the revised value of the requested memory attribute.

In some examples, responsive to a memory allocation decision allocating a memory cluster in a memory accessible to the allocator 104, the controller 206 modifies temporary memory allocation results stored in the temporary allocation map database 208. For example, during a build process of an executable (e.g., software, program, etc.), multiple memory allocations may be attempted and aggregated into the temporary allocation map database 208. In this way, temporary allocations may be made, the allocations may be optimized, or the like in the temporary allocation map database 208 during the build. At an end of the build, the temporary allocation map database 208 may be stored as a final memory map, such as the memory map 108.

In some examples, the allocator 104 may be configurable, or reconfigurable, during the build time or at run time. For example, the processor 102, or another device, requestor, or the like, may configure or reconfigure the allocator 104. In some examples, different devices may have different permissions levels with respect to the allocator 104. For example, a first device may have permissions for modifying a configuration of the controller 206 while a second device does not. Similarly, a third device may have permissions for modifying one or more of the databases 202, 204 while a fourth device may not have permissions for modifying one or more of the databases 202, 204. In an embodiment, processor 102 has permission to modify a configuration of the controller 206 and databases 202 and 204.

FIG. 3 is a flowchart of a method 300 of operation of the allocator 104, in accordance with various examples. In some examples, the method 300 is implemented at least in part by the controller 206, such as in response to receipt of a memory allocation, or reallocation, request. In an example, the method 300 is implemented as a series of computer-executable instructions, or code, which may be stored in a non-transitory storage medium and be executed by a processor or processors, controller or controllers, or the like. For example, the computer-executable instructions may be executed at least by the controller 206 to provide at least some functionality of the method 300. Responsive to execution, the instructions may cause the processor(s) and/or other components of the computing device to be configured or programmed in a particular state, or control the processor(s) or other components to perform one or more actions.

At operation 302, a memory allocation (or reallocation) request is received from a requester. In some examples, the memory allocation request is received by the allocator 104, such as by the controller 206. The memory allocation request may be substantially as described above herein, and indicating or including an implicitly or explicitly requested memory attribute or attributes, as well as a requested memory cluster size. In some examples, a reallocation request may be treated as sequential deallocation operations, as described below with respect to FIG. 4, followed by an allocation operation as described with respect to FIG. 3, or vice versa, in which data is copied from deallocated memory to reallocated memory, and is not separately described herein.

At operation 304, the controller 206 determines the requested memory attribute or attributes. The requested memory attributes, if any are provided, may be determined implicitly or explicitly, as described above herein.

At operation 306, the controller 206 accesses one or more databases associated with memory allocation. For example, the controller 206 may access the system performance database 202, the memory attribute database 204, and/or the temporary allocation map database 208. In some examples, accessing a database includes indexing into or otherwise referencing or accessing the database. In other examples, accessing the database includes loading data from the database into temporary storage of the controller 106, such as one or more registers, one or more caches, or the like.

At operation 308, the controller 206 processes the memory allocation request to make a memory allocation decision. In some examples, the memory allocation decision results in the allocation of memory that comports to the requested memory attribute. In some examples, the memory allocation decision results in allocation of memory that does not comport to the requested memory attribute. In some examples, the memory allocation decision does not result in allocation of memory.

For example, based on the requested memory attribute and the requested memory cluster size, the controller 206 determines whether an available memory exists, whether requested memory attribute is supportable by operational parameters of the electronic device 100, and whether a sufficient allocation range is available in the available memory, if an available memory exists, as described above herein. Based on this determination, the memory allocation decision is formed.

In various examples, the method 300 also includes operation 310. At operation 310, responsive to the memory allocation decision, the controller 206 takes other actions based on the memory allocation decision. For example, the controller 206 may perform a memory allocation, as described above herein, updating a temporary and/or final memory map. At operation 310, the controller 206 also, or alternatively, may provide memory allocation feedback indicating that a compliant memory allocation was performed, may provide memory allocation feedback indicating that a non-compliant memory allocation was performed, may provide memory allocation feedback indicating that a memory allocation was not performed (which may or may not include a recommendation for a revised memory allocation request having an altered value for the requested memory attribute, such as a value corresponding to a lower performance level), or any other suitable feedback or information related to the memories, allocator 104, or memory allocation.

In some examples, responsive to the memory allocation feedback, the controller 206 may receive a second memory allocation request. In such an example, the second memory allocation request may be handled as if it was an original memory allocation request, beginning at operation 302.

FIG. 4 is a flowchart of a method 400 of operation of the allocator 104, in accordance with various examples. In some examples, the method 400 is implemented at least in part by the controller 206, such as in response to receipt of a memory deallocation request. In an example, the method 400 is implemented as a series of computer-executable instructions, or code, which may be stored in a non-transitory storage medium and be executed by a processor or processors, controller or controllers, or the like. For example, the computer-executable instructions may be executed at least by the controller 206 to provide at least some functionality of the method 400. Responsive to execution, the instructions may cause the processor(s) and/or other components of the computing device to be configured or programmed in a particular state, or control the processor(s) or other components to perform one or more actions.

At operation 402, the controller 206 receives a memory deallocation request. In some examples, the memory deallocation request may be implicit in a received memory reallocation request, as described above herein.

At operation 404, the controller 206 deallocates one or more memory clusters by modifying a temporary and/or final memory map.

At operation 406, the controller 206 also, or alternatively, may provide memory deallocation feedback indicating that deallocation has been successfully performed, including an updated memory map, indicating that the memory deallocation request was invalid and therefore memory deallocation has not been performed, indicating an error in the memory deallocation, or the like.

FIG. 5 is a flowchart of a method 500 of operation of the allocator 104, in accordance with various examples. In some examples, the method 500 is implemented at least in part by the controller 206, such as in response to receipt of a memory allocation, or reallocation, request. In an example, the method 500 is implemented as a series of computer-executable instructions, or code, which may be stored in a non-transitory storage medium and be executed by a processor or processors, controller or controllers, or the like. For example, the computer-executable instructions may be executed at least by the controller 206 to provide at least some functionality of the method 500. Responsive to execution, the instructions may cause the processor(s) and/or other components of the computing device to be configured or programmed in a particular state, or control the processor(s) or other components to perform one or more actions. In some examples, method 500 is implemented in, or as at least a portion of, operation 308 and/or operation 310 of the method 300, described above with respect to FIG. 3.

At operation 502, the controller 206 determines whether sufficient space exists in a memory having a requested memory attribute and determined to be available to provide a requested memory allocation. Responsive to sufficient space existing, the method 500 proceeds to operation 504. Responsive to sufficient space not existing, or responsive to no memories accessible by the electronic device at a given time being capable of providing the requested memory attributes, the method 500 proceeds to operation 506.

At operation 504, the controller modifies a memory map associated with one or more of the available memories to include a memory cluster as requested by the memory allocation request. The memory map may be a final memory map or a temporary memory map that is subsequently copied or written to a final memory map, as described above herein.

At operation 506, the controller 206 performs one or more actions. In an example, the controller 206 may wait a programmed amount of time and reattempt the allocation (e.g., by returning to operation 502). In another example, the controller 206 may perform a best fit allocation which does not satisfy at least one requested memory attribute indicated by the memory allocation request. In such an example, the controller 206 may proceed to operation 508 and provide a notification to the requester that a memory allocation has been performed, but that the memory allocation does not provide the at least one requested memory attribute (e.g., a non-compliant allocation notification). In another example, the controller 206 may proceed to operation 508 and provide a notification to the requester that a memory having the at least one requested memory attribute is not available. In such an example, the controller 206 may provide a recommendation for modifying the at least one requested memory attribute from a first value which is not available in a memory accessible by the electronic device to a second value which is available in a memory accessible by the electronic device.

In some examples, responsive to the notification, at operation 510, the controller 206 receives a second memory allocation request from the requester, in which the second memory allocation request includes a memory allocation in a memory capable of providing the requested memory attribute having the second value. Responsive to the second memory allocation request, at operation 512, the controller 206 may modify a memory map associated with one or more of the available memories to include a memory cluster as requested by the second memory allocation request.

FIG. 6 is a flowchart of a method 600 of operation of the allocator 104, in accordance with various examples. In some examples, the method 600 is implemented at least in part by the controller 206, such as in response to receipt of a memory allocation, or reallocation, request. In an example, the method 600 is implemented as a series of computer-executable instructions, or code, which may be stored in a non-transitory storage medium and be executed by a processor or processors, controller or controllers, or the like. For example, the computer-executable instructions may be executed at least by the controller 206 to provide at least some functionality of the method 600. Responsive to execution, the instructions may cause the processor(s) and/or other components of the computing device to be configured or programmed in a particular state, or control the processor(s) or other components to perform one or more actions.

At operation 602, the controller 206 receives a first memory allocation request from a first requester (which may be a first processor, such as the processor 102). In an example, the first memory allocation request includes a first requester identifier that uniquely identifies the first requestor. The first memory allocation request may be a request for a memory allocation having a first size in a memory having a first memory attribute.

At operation 604, the controller 206 allocates the first requester a memory cluster in a first memory responsive to the first memory allocation request. In an example, the controller 206 allocates the memory cluster for the first requester in the first memory at least partially responsive to a value of the first request identifier.

At operation 606, the controller 206 receives a second memory allocation request from a second requester (which may be a second processor, such as the processor 103). In an example, the second memory allocation request includes a second requester identifier that uniquely identifies the second requestor. The second memory allocation request may be a request for a memory allocation having a second size in a memory having a second memory attribute. In some examples, the second memory attribute may be the same as the first memory attribute, or the first memory may be capable of providing a memory cluster having both the first and second memory attributes, and may have sufficient unallocated, or free, space for the allocation of memory clusters pursuant to both the first and second memory allocation requests.

At operation 608, the controller 206 determines, based on memory attributes of accessible memories, a second memory capable of providing the second requested memory attribute. In an example, the second memory may have sufficient unallocated, or free, space for the allocation of memory clusters pursuant to both the first and second memory allocation requests. In some examples, the second memory has at least one performance level less than the first memory.

At operation 610, responsive to determining that sufficient space exists in the second available memory, allocate the second memory cluster in the second memory based on the second memory allocation request. In an example, the controller 206 allocates the second memory cluster for the second requester in the second memory at least partially responsive to a value of the second request identifier. For example, despite the first memory having sufficient free space to support the second memory cluster, and the first memory having a capability of providing the second requested memory attribute, based on the second request identifier the controller 206 may allocate the second memory cluster in the second memory rather than in the first memory.

In some embodiments, method 600 is implemented by a controller (e.g., 206) that is implemented as part of a system-on-chip (SoC) that also includes, e.g., in a single integrated circuit, a first processor (e.g., 102), as the first requester, for executing, e.g., applications, and a second processor (e.g., 103), as the second requester, for controlling (e.g., wireless) communications (such as for implementing/controlling the physical layer of, e.g., Bluetooth or Bluetooth Low Energy) with other devices, where, e.g., the first memory is faster and/or consumes higher power than the second memory.

Example embodiments of the present disclosure are summarized here. Other embodiments can also be understood from the entirety of the specification and the claims filed herein.

Example 1. An apparatus, including: a data store; and a controller communicatively coupled to the data store, the controller configured to: receive a request to allocate a memory cluster, the request indicating a requested memory attribute other than a requested size of the memory cluster; responsive to receipt of the request, determine, based on one or more memory attributes of a plurality of memories accessible by the apparatus, an available memory from among the plurality of memories, the available memory capable of providing the requested memory attribute; and responsive to determining the available memory, make a memory allocation decision.

Example 2. The apparatus of example 1, where the controller is configured to: receive the request from a requester; and transmit, to the requester, memory allocation feedback based on the memory allocation.

Example 3. The apparatus of one of examples 1 or 2, where the controller is configured to: receive the request from a processor; and transmit, to the processor, memory allocation feedback based on the memory allocation.

Example 4. The apparatus of one of examples 1 to 3, where the controller is configured to access a partition of the data store to determine available memory attributes of memories accessible by the apparatus.

Example 5. The apparatus of one of examples 1 to 4, where the request is a first request associated with a first requester identifier, the available memory is a first available memory, and where the controller is configured to: receive a second request to allocate a second memory cluster, the second request associated with a second requester identifier and indicating a second requested memory attribute other than a requested size of the second memory cluster, where the second requested memory attribute is for a performance level different than the requested memory attribute; responsive to receipt of the second request and a value of the second requester identifier, determine, based on the one or more memory attributes of the plurality of memories accessible by the apparatus, a second available memory from among the plurality of memories, the second available memory capable of providing the second requested memory attribute, where the second available memory has at least one performance level less than the first available memory; determine whether sufficient space exists in the second available memory based on the requested size of the second memory cluster, where sufficient space exists in the available memory based on the requested size of the second memory cluster; and responsive to determining that sufficient space exists in the second available memory, allocate the second memory cluster in the second available memory based on the second request.

Example 6. The apparatus of one of examples 1 to 5, where: the request is a first request received from a first requester, the first request includes a first requester identifier uniquely identifying the first requester and the requested size for the memory cluster; the plurality of memories include at least the available memory and a second memory; and the controller is configured to: receive a second request from a second processor to allocate a second memory cluster, the second request including a second source identifier uniquely identifying the second processor and a second requested size for the second memory cluster; based on the memory allocation decision, allocate the memory cluster in the available memory based on a value of the first source identifier, where the available memory has a first amount of free space greater than a sum of the requested size for the memory cluster and the second requested size for the second memory cluster; and allocate the second memory cluster in the second memory based on a value of the second source identifier, where the second memory has a second amount of free space greater than the sum of the requested size for the memory cluster and the second requested size for the second memory cluster.

Example 7. The apparatus of one of examples 1 to 6, where the request is received in a build process and the request is for a memory cluster to be assigned during the build process in an initial memory map determined by the controller.

Example 8. The apparatus of one of examples 1 to 7, where the indication of the requested memory attribute is an implicit indication.

Example 9. The apparatus of one of examples 1 to 8, where the indication of the requested memory attribute is an identification of a requester from which the request was received.

Example 10. The apparatus of one of examples 1 to 9, where the controller is configured to reference into the data store based on the identification of the requester providing the request to determine the requested memory attribute, where the requested memory attribute is mapped in a partition of the data store to the identification of the requester.

Example 11. The apparatus of one of examples 1 to 10, where the indication of the requested memory attribute is an explicit indication providing, in the request, a requested value for the requested memory attribute.

Example 12. The apparatus of one of examples 1 to 11, where, responsive to determining the available memory, the controller is configured to: determine whether sufficient space exists in the available memory based on the requested size of the memory cluster; and responsive to determining that sufficient space exists in the available memory, allocate the memory cluster in the available memory based on the request.

Example 13. The apparatus of one of examples 1 to 12, where responsive to allocating the memory cluster in the available memory based on the request, the controller is configured to provide the memory allocation feedback indicating a memory allocation map of the available memory.

Example 14. The apparatus of one of examples 1 to 13, where, responsive to determining the available memory, the controller is configured to: determine whether sufficient space exists in the available memory based on the requested size of the memory cluster; responsive to determining that sufficient space does not exist in the available memory, deallocate a second memory cluster from the available memory; and allocate the memory cluster in the available memory based on the request.

Example 15. The apparatus of one of examples 1 to 14, where responsive to allocating the memory cluster in the available memory based on the request, the controller is configured to provide the memory allocation feedback indicating a memory allocation map of the available memory.

Example 16. The apparatus of one of examples 1 to 15, where, responsive to determining the available memory, the controller is configured to: determine whether sufficient space exists in the available memory based on the requested size of the memory cluster; and responsive to determining that sufficient space does not exist in the available memory, provide memory allocation feedback indicating the requested memory cluster cannot be allocated.

Example 17. The apparatus of one of examples 1 to 16, where, responsive to determining the available memory, the controller is configured to: determine whether sufficient space exists in the available memory based on the requested size of the memory cluster; and responsive to determining that sufficient space does not exist in the available memory, allocating the memory cluster to another memory of the plurality of memories, where the another memory at least partially conforms to the requested memory attribute.

Example 18. The apparatus of one of examples 1 to 17, where the controller is further configured to provide memory allocation feedback indicating the requested memory cluster has been allocated to the another memory and is not to the available memory.

Example 19. The apparatus of one of examples 1 to 18, where the requested memory attribute includes an access speed, an access type, a power consumption value, an operation profile, a cluster arrangement policy, a reliability value, a security policy, or a redundancy value.

Example 20. The apparatus of one of examples 1 to 19, further including the plurality of memories.

Example 21. The apparatus of one of examples 1 to 20, where the controller, the data store, and the plurality of memories are integrated in the same integrated circuit.

Example 22. The apparatus of one of examples 1 to 20, where the plurality of memories is external to the data store and the controller.

Example 23. The apparatus of one of examples 1 to 22, where the available memory is a shared memory configured to be shared among a plurality of requesters.

Example 24. An apparatus, including: a data store; a controller communicatively coupled to the data store and configured to: receive a request to allocate a memory cluster, the request indicating a requested memory attribute other than a requested size of the memory cluster; responsive to receipt of the request, access a first partition of the data store to determine available memory attributes of a plurality of memories accessible by the apparatus at a first time; determine, based on the available memory attributes, that no memory from among the plurality of memories is capable of providing the requested memory attribute; responsive to the determination, make a memory allocation decision; and transmit memory allocation feedback based on the memory allocation decision to a requester from which the request was received.

Example 25. The apparatus of example 24, where responsive to the determination that no memory from among the plurality of memories is capable of providing the requested memory attribute, the controller is configured to determine the memory allocation decision indicating that the request cannot be performed, and provide the memory allocation feedback indicating that a memory cluster has not been allocated pursuant to the request.

Example 26. The apparatus of one of examples 24 or 25, where responsive to the determination that no memory from among the plurality of memories is capable of providing the requested memory attribute, the controller is configured to: determine an available memory of the plurality of memories, the available memory capable of providing performance within a programmed threshold range of the requested memory attribute; allocate the memory cluster in the available memory based on the request; and provide the memory allocation feedback indicating a memory allocation map of the available memory and an indication that the requested memory attribute was not provided or an indication of a value provided by the available memory for the requested memory attribute.

Example 27. The apparatus of one of examples 24 to 26, where the controller is configured to provide, in the memory allocation feedback, a value for a second requested memory attribute which a second memory from among the memories is capable of providing.

Example 28. The apparatus of one of examples 24 to 27, where the controller is configured to: receive a second request to allocate the memory cluster, the second request indicating the second requested memory attribute, where the second requested memory attribute is an attribute other than the requested size of the memory cluster; allocate the memory cluster in the second available memory based on the request; and provide a second memory allocation feedback indicating a memory allocation map of the second available memory.

Example 29. The apparatus of one of examples 24 to 28, where responsive to the determination that no memory from among the plurality of memories is capable of providing the requested memory attribute, the controller is configured to: wait a programmed amount of time; following an expiration of the programmed amount of time, access the first partition of the data store to determine second available memory attributes of memories accessible by the apparatus at a second time; determine, based on the second available memory attributes, an available memory from among the memories, the available memory capable of providing the requested memory attribute; allocate the memory cluster in the available memory based on the request; and provide the memory allocation feedback indicating a memory allocation map of the available memory.

Example 30. The apparatus of one of examples 24 to 29, where the controller is configured to, prior to receiving the request: determine memory attributes of memories accessible by the apparatus; write the memory attributes to the first partition of the data store; and update the first partition of the data store responsive to servicing an allocation request, reallocation request, or deallocation request with respect to any of the memories.

Example 31. The apparatus of one of examples 24 to 30, where the indication of the requested memory attribute is an implicit indication.

Example 32. The apparatus of one of examples 24 to 31, where the indication of the requested memory attribute is an identification of the requester.

Example 33. The apparatus of one of examples 24 to 32, where the controller is configured to reference into the data store based on the identification of the requester providing the request to determine the requested memory attribute, where the requested memory attribute is mapped in a second partition of the data store to the identification of the requester.

Example 34. The apparatus of one of examples 24 to 33, where the indication of the requested memory attribute is an explicit indication providing, in the request, a requested value for the requested memory attribute.

Example 35. The apparatus of one of examples 24 to 34, where the requested memory attribute includes an access speed, an access type, a power consumption value, an operation profile, a cluster arrangement policy, a reliability value, a security policy, or a redundancy value.

While this disclosure has been described with reference to illustrative embodiments, this description is not limiting. Various modifications and combinations of the illustrative embodiments, as well as other embodiments, will be apparent to persons skilled in the art upon reference to the description.

What is claimed is:

1. An apparatus, comprising:
   a data store; and a controller communicatively coupled to the data store, the controller configured to:

receive a first request to allocate first a memory cluster, the first request indicating a first requested memory attribute other than a requested size of the first memory cluster;

responsive to the first request, determine, based on one or more memory attributes of a plurality of memories a first memory from the plurality of memories the first memory capable of providing the first requested memory attribute;

responsive to determining the first memory, determine whether sufficient space exists in the first memory based on the requested size of the first memory cluster; and responsive to determining that sufficient space does not exist in the first memory, deallocate a second memory cluster from the first memory; and allocate the first memory cluster in first available memory.

2. The apparatus of claim 1, wherein the controller is configured to:

receive the first request from a requester; and transmit, to the requester, memory allocation feedback based on the allocation of the first memory cluster.

3. The apparatus of claim 1, wherein the controller is configured to access a partition of the data store to determine the one or more memory attributes of the plurality of memories.

4. The apparatus of claim 1, wherein the first request is associated with a first requester identifier, and wherein the controller is configured to:

receive a second request to allocate a third memory cluster, the second request associated with a second requester identifier and indicating a second requested memory attribute other than a requested size of the third memory cluster, wherein the second requested memory attribute is for a performance level different than the first requested memory attribute;

responsive to the second request and a value of the second requester identifier, determine, based on the one or more memory attributes of the plurality of memories, a second memory from the plurality of memories, the second memory capable of providing the second requested memory attribute, wherein the second memory has at least one performance level less than the first memory;

determine whether sufficient space exists in the second memory based on the requested size of the third memory cluster; and responsive to determining that sufficient space exists in the second memory, allocate the third memory cluster in the second memory.

5. The apparatus of claim 1, wherein:

the first request is received from a first requester, the first request includes a first source identifier uniquely identifying the first requester and the requested size for the first memory cluster; and the controller is configured to:

receive a second request from a second requester to allocate a third memory cluster, the second request including a second source identifier uniquely identifying the second requester and a second requested size for the third memory cluster;

allocate the first memory cluster in the first memory based on a value of the first source identifier, wherein the first memory has a first amount of free space greater than a sum of the requested size for the first memory cluster and the second requested size for the third memory cluster; and allocate the third memory cluster in a second memory of the plurality of memories based on the second source identifier, wherein the second memory has a second amount of free space greater than the sum of the requested size for the first memory cluster and the second requested size for the third memory cluster.

6. The apparatus of claim 1, wherein the first request is received in a build process and the first request is for a memory cluster to be assigned during the build process in an initial memory map determined by the controller.

7. The apparatus of claim 1, wherein the first requested memory attribute is indicated by an implicit indication.

8. The apparatus of claim 7, wherein the first requested memory attribute is indicated by an identification of a requester from which the request was received.

9. The apparatus of claim 8, wherein the controller is configured to reference into the data store based on the identification of the requester to determine the first requested memory attribute, and wherein the first requested memory attribute is mapped in a partition of the data store to the identification of the requester.

10. The apparatus of claim 1, wherein the first requested memory attribute is indicated by an explicit indication providing a requested value for the first requested memory attribute.

11. The apparatus of claim 1, wherein, responsive to determining the first memory, the controller is configured to:

responsive to determining that sufficient space exists in the first memory, allocate the first memory cluster in the first memory without deallocating the second memory cluster from the first memory.

12. The apparatus of claim 11, wherein responsive to allocating the first memory cluster in the first memory, the controller is configured to provide memory allocation feedback indicating a memory allocation map of the first memory.

13. The apparatus of claim 1, wherein the controller is configured to:

responsive to determining that sufficient space does not exist in the first memory, provide memory allocation feedback indicating the first memory cluster cannot be allocated.

14. The apparatus of claim 1, wherein the controller is configured to:

responsive to determining that sufficient space does not exist in the first memory, allocating the first memory cluster to a second memory of the plurality of memories, wherein the second memory at least partially conforms to the first requested memory attribute.

15. The apparatus of claim 14, wherein the controller is further configured to provide memory allocation feedback indicating the first memory cluster is allocated to the second memory and not to the first memory.

16. The apparatus of claim 1, wherein the first requested memory attribute includes one or more of: an access speed, an access type, a power consumption value, an operation profile, a cluster arrangement policy, a reliability value, a security policy, or a redundancy value.

17. The apparatus of claim 1, further comprising the plurality of memories.

18. The apparatus of claim 17, wherein the controller, the data store, and the plurality of memories are integrated in a same integrated circuit.

19. The apparatus of claim 17, wherein the plurality of memories is external to the data store and the controller.

20. The apparatus of claim 1, wherein the first memory is a shared memory configured to be shared among a plurality of requesters.

21. The apparatus of claim 1, wherein the first memory cluster has been deallocated prior to receipt of the first request, and wherein the first request is a request to re-allocate the first memory cluster.

22. A method, comprising:

receiving, by a controller, a first request to allocate a first memory cluster, the first request indicating a first requested memory attribute other than a requested size of the first memory cluster;

determining, by the controller, a first memory from a plurality of memories based on one or more memory attributes of the plurality of memories, wherein the first memory is capable of providing the first requested memory attribute;

determining, by the controller, whether available space exists in the first memory based on the requested size of the first memory cluster; and responsive to determining that sufficient space does not exist in the first memory, deallocating, by the controller, a second memory cluster from the first memory; and allocating, by the controller, the first memory cluster in the first memory.

23. The method of claim 22, wherein the first request is provided by a requester; and the method further comprises:

transmitting, by the controller, memory allocation feedback based on the allocation of the first memory cluster to the requester.

24. The method of claim 22, wherein the first request is associated with a first requester identifier, and wherein the method further comprises:

receiving, by the controller, a second request to allocate a third memory cluster, the second request associated with a second requester identifier and indicating a second requested memory attribute for a performance level different than the first requested memory attribute;

determining, by the controller, a second memory from the plurality of memories, based on the one or more memory attributes of the plurality of memories, wherein the second memory is capable of providing the second requested memory attribute, and wherein the second memory has at least one performance level less than the first memory;

determining, by the controller, whether sufficient space exists in the second memory based on the requested size of the third memory cluster; and responsive to determining that sufficient space exists in the second memory, allocating, by the controller, the third memory cluster in the second memory.

25. The method of claim 22, wherein the first requested memory attribute is indicated by an identification of a requester which provides the first request.

26. The method of claim 25, wherein the controller references a data store based on the identification of the requester to determine the first requested memory attribute, and wherein the first requested memory attribute is mapped in a partition of the data store to the identification of the requester.

27. The method of claim 22, wherein the first requested memory attribute is indicated by an explicit indication providing a requested value for the first requested memory attribute.

28. The method of claim 22, further comprising:

responsive to determining that sufficient space exists in the first memory, allocating, by the controller, the first memory cluster in the first memory without deallocating the second memory cluster from the first memory.

29. The method of claim 28, further comprising:

providing, by the controller, memory allocation feedback indicating a memory allocation map of the first memory.

30. The method of claim 22, wherein the first requested memory attribute includes one or more of: an access speed, an access type, a power consumption value, an operation profile, a cluster arrangement policy, a reliability value, a security policy, or a redundancy value.

31. The method of claim 22, wherein the first request is a request to re-allocate the first memory cluster.

\* \* \* \* \*